R. McMURRAY & W. H. GOODS.
Tag-Holder.
No. 209,769. Patented Nov. 12, 1878.
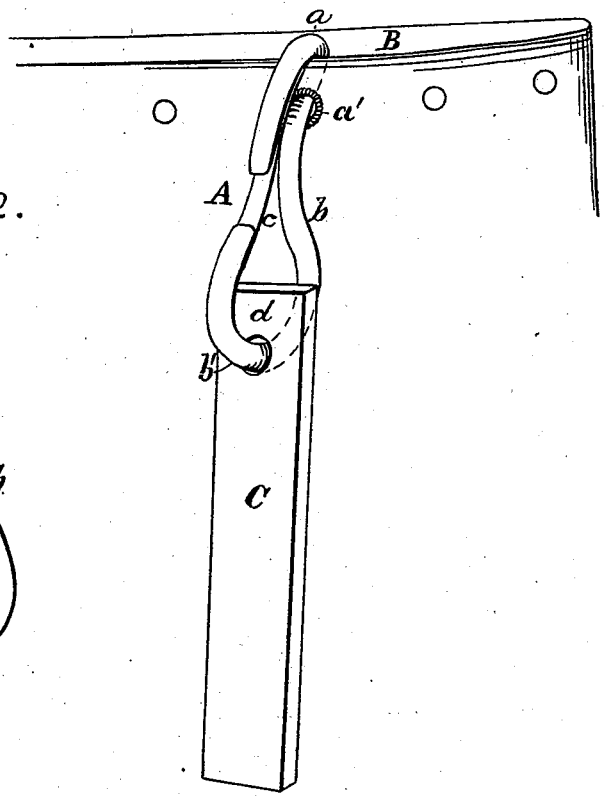
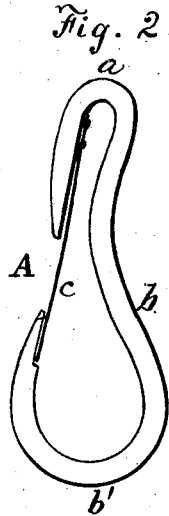
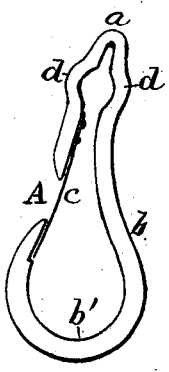
Witnesses:
W. Burris
E. P. Goodwin
Inventors:
Robert McMurray
William H. Goods
by G. B. Fawles.
Attorney.

UNITED STATES PATENT OFFICE.

ROBERT McMURRAY AND WILLIAM H. GOODS, OF WASHINGTON, D. C.;
SAID GOODS ASSIGNOR TO SAID McMURRAY.

IMPROVEMENT IN TAG-HOLDERS.

Specification forming part of Letters Patent No. 209,769, dated November 12, 1878; application filed March 23, 1878.

*To all whom it may concern:*

Be it known that we, ROBERT MCMURRAY and WILLIAM H. GOODS, of Washington city, in the county of Washington and District of Columbia, have invented an Adjustable Spring Tag-Holder for Mail-Bags; and we do hereby declare that the following is a full, clear, and exact description thereof, which will enable others skilled in the art to which it appertains to make and use the same, reference being had to the accompanying drawings, and to letters of reference marked thereon, which form a pa t of this specification.

Figure 1 is a perspective view, showing the holder with tag attached to a mail-bag. Figs. 2 and 3 are side views of the tag-holder.

Like letters in all the figures of the drawing indicate like parts.

This invention relates to a mail-bag tag-holder having a shank for attaching the holder to a mail-bag, and having an enlarged circular hook, and provided with a snap-spring, the said holder being bent inward to prevent the tag from getting between the spring and the side of the holder, and the hook enlarged sufficiently to prevent the end of the tag when in position on the hook from impinging against the spring, and thus breaking it and releasing itself from the hook, as will be hereinafter more fully explained.

The holder A is made of thick wire, having the upper part, $a$, formed to connect it with the eyelet $a'$ of the mail-bag B, and the lower part curved to form the enlarged circular hook $b'$. A snap-spring, $c$, is riveted to the inner side of the end of the upper part of the holder, and the end of the hook, on the inner side thereof, is provided with a recess to receive the free end of the spring for retaining the tag C on the hook. The holder is bent inward at $b$ to prevent the tag from getting between the side of the holder and the spring.

The tag C is of wood, such as is ordinarily used on mail-bags.

The hook $b'$ is made circular, and enlarged sufficiently to allow the required space for the projecting end $d$ of the tag, and to prevent the tag from extending to and impinging against the spring.

The degree of curvature in the bend at $b$ will depend upon the size of the tag, the holder being bent in, so as to leave only space enough for the tag to be freely slipped onto the hook.

The upper part of the holder may be provided with a bend or seat, $d$, for the eyelet of the bag to rest in. (See Fig. 3.)

The holder is attached to the bag by pressing the spring in and slipping the hook $b$ through the eyelet $a'$ of the bag, and bringing the holder around until the upper part, $a$, embraces the edge of the bag. (See Fig. 1.)

To attach the tag, the spring is pressed in as before, and the hook $b'$ slipped through the hole in the tag, the retraction of the spring holding the tag in position on the hook.

Thus it will be perceived the holder can be readily attached to the bag, and as readily detached from it, as may be required in changing the holder from old or worn-out bags to new ones, or for other causes, thus obviating the use of an instrument to accomplish it, and avoiding the liability of the tag being jerked or pulled off from the hook, as heretofore.

We are aware of the patent to C. W. Saladee for snap-link, dated September 26, 1865, No. 59,167, and the patent to W. W. Campbell for spring-link, dated March 6, 1877, No. 188,101, both of which are ordinary chain-links, open on one side and closed by a snap-spring, and adapted for use in harness and chains, and which are not at all practical for the purposes of a tag-holder for mail-bags. We therefore do not claim, broadly, a snap link or hook; but What we do claim, and desire to secure by Letters Patent, is—

The mail-bag tag-holder having the part $a$, for connecting with the mail-bag, with sides parallel, or nearly so, and with or without the eyelet-seat $d$, and having one of the sides bent inward, as shown at $b$, and provided with the snap-spring $c$, and having the enlarged hook $b'$, for holding the tag C, all substantially as and for the purpose set forth.

In testimony that we claim the foregoing as our own invention we affix our signatures in presence of two witnesses.

R. McMURRAY.
W. H. GOODS.

Witnesses:
H. A. DANIELS,
WM. H. CHASE.